(12) United States Patent
Gao et al.

(10) Patent No.: US 12,155,814 B2
(45) Date of Patent: Nov. 26, 2024

(54) DISPLAY METHOD AND DISPLAY DEVICE

(71) Applicant: BOE Technology Group Co., Ltd., Beijing (CN)

(72) Inventors: Jian Gao, Beijing (CN); Sen Ma, Beijing (CN); Yanliu Sun, Beijing (CN); Jing Yu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/920,462

(22) PCT Filed: Nov. 29, 2021

(86) PCT No.: PCT/CN2021/133940
§ 371 (c)(1),
(2) Date: Oct. 21, 2022

(87) PCT Pub. No.: WO2023/092545
PCT Pub. Date: Jun. 1, 2023

(65) Prior Publication Data
US 2024/0214549 A1  Jun. 27, 2024

(51) Int. Cl.
| | | |
|---|---|---|
| *H04N 13/366* | (2018.01) | |
| *H04N 13/128* | (2018.01) | |
| *H04N 13/178* | (2018.01) | |
| *H04N 13/305* | (2018.01) | |
| *H04N 13/324* | (2018.01) | |

(52) U.S. Cl.
CPC ......... *H04N 13/366* (2018.05); *H04N 13/128* (2018.05); *H04N 13/178* (2018.05); *H04N 13/305* (2018.05); *H04N 13/324* (2018.05)

(58) Field of Classification Search
None
See application file for complete search history.

(56) References Cited

U.S. PATENT DOCUMENTS

| | | |
|---|---|---|
| 2012/0154396 A1 | 6/2012 | Atkins |
| 2013/0321596 A1 | 12/2013 | Li et al. |

(Continued)

FOREIGN PATENT DOCUMENTS

| | | |
|---|---|---|
| CN | 102484733 A | 5/2012 |
| CN | 102710955 A | 10/2012 |

(Continued)

*Primary Examiner* — Xiaolan Xu
(74) *Attorney, Agent, or Firm* — WHDA, LLP

(57) ABSTRACT

Provided are a display method and a display device, the display method includes: acquiring a viewing position of a user; determining a viewpoint image matched with the viewing position from an image source library to obtain a first viewpoint image; determining a plurality of viewpoint images having parallax with the first viewpoint image from the image source library to obtain a parallax image set; determining, for at least one pixel island, a center sub-pixel from a plurality of sub-pixels in the pixel island according to a positional relationship between the viewing position and at least one sub-pixel in the pixel island; and driving the center sub-pixel in at least one pixel island to display according to the first viewpoint image, and driving other sub-pixels in at least one pixel island to display according to the parallax image set, so as to form a target display picture.

19 Claims, 10 Drawing Sheets

(56) References Cited

U.S. PATENT DOCUMENTS

| | | | |
|---|---|---|---|
| 2014/0043335 A1 | 2/2014 | Kobayashi et al. | |
| 2015/0085089 A1* | 3/2015 | Shigemura | H04N 13/351 |
| | | | 348/54 |
| 2018/0063518 A1 | 3/2018 | Shigemura | |
| 2019/0058874 A1 | 2/2019 | Kim et al. | |
| 2022/0366819 A1 | 11/2022 | Gao et al. | |
| 2022/0377311 A1 | 11/2022 | Gao et al. | |

FOREIGN PATENT DOCUMENTS

| | | |
|---|---|---|
| CN | 103518372 A | 1/2014 |
| CN | 104317120 A | 1/2015 |
| CN | 104519334 A | 4/2015 |
| CN | 111624784 A | 9/2020 |
| CN | 111766716 A | 10/2020 |

\* cited by examiner

DISPLAY METHOD AND DISPLAY DEVICE

CROSS-REFERENCE TO RELATED APPLICATION

This application is a Section 371 National Stage Application of International Application No. PCT/CN2021/133940, filed on Nov. 29, 2021, entitled "DEVICE METHOD AND DISPLAY DEVICE", the content of which is incorporated herein by reference in entirety.

TECHNICAL FIELD

The present disclosure relates to a field of display technology, and in particular, to a display method and a display device.

BACKGROUND

At present, in three-dimensional display, a fixed sequence is generally adopted to perform a layout. For example, FIG. 1a schematically shows a schematic diagram of a layout effect in an example. As shown in FIG. 1a, in this example, the layout is performed cyclically with a cycle of view 1, view 2, view 3, and view 4. When the human eye observes a display device at a position shown in FIG. 1a, the left eye of the human is at a position of view 1, and the right eye of the human is at a position of view 3, and by making the view 1 and the view 3 have a certain parallax, the human eye may see a three-dimensional image.

Since the layout is performed in a fixed sequence, the human eye needs to be in a specific position to see the three-dimensional image. Once the human eye moves, reverse vision may occur, resulting in an erroneous three-dimensional visual experience.

SUMMARY

In view of the above-mentioned problems, the present disclosure provides a display method, applied in a display device, the display device includes a plurality of pixel islands, at least one pixel island includes a plurality of sub-pixels, and the display method includes:
acquiring a viewing position of a user;
determining a viewpoint image matched with the viewing position from an image source library to obtain a first viewpoint image;
determining a plurality of viewpoint images having parallax with the first viewpoint image from the image source library to obtain a parallax image set;
determining, for at least one of the pixel islands, a center sub-pixel from a plurality of sub-pixels in the pixel island according to a positional relationship between the viewing position and at least one sub-pixel in the pixel island; and
driving the center sub-pixel in at least one of the pixel islands to display according to the first viewpoint image, and driving other sub-pixels in at least one of the pixel islands to display according to the parallax image set, so as to form a target display picture, wherein the target display picture is configured to enable the user to see a three-dimensional image corresponding to the first viewpoint image when viewing the display device at the viewing position.

According to the embodiments of the present disclosure, a reference point is configured in a display area of the display device, and the determining a viewpoint image matched with the viewing position from an image source library to obtain a first viewpoint image includes:
determining a visual area matched with the viewing position from a preset visual area distribution map according to a position difference between the viewing position and the reference point to obtain a first visual area; and
extracting a viewpoint image matched with the first visual area from the image source library to obtain the first viewpoint image.

According to the embodiments of the present disclosure, the determining a visual area matched with the viewing position from a preset visual area distribution map according to a position difference between the viewing position and the reference point to obtain a first visual area, includes:
determining an angle coordinate of the viewing position relative to the reference point according to a preset angle coordinate system, wherein the preset angle coordinate system is an angle coordinate system established according to the reference point and a plane where the display area is located; and
determining a visual area matched with the angle coordinate from the preset visual area distribution map to obtain the first visual area.

According to the embodiments of the present disclosure, the reference point is located at a center of the display area.

According to the embodiments of the present disclosure, the determining a plurality of viewpoint images having parallax with the first viewpoint image from the image source library to obtain a parallax image set, includes:
determining a viewpoint image having a first preset parallax relationship with the first viewpoint image from the image source library to obtain at least one second viewpoint image;
determining a viewpoint image having a second preset parallax relationship with the first viewpoint image from the image source library to obtain at least one third viewpoint image; and
constructing a parallax image set by the at least one second viewpoint image and the at least one third viewpoint image, wherein a parallax of the at least one second viewpoint image and the first viewpoint image is opposite to a parallax of the at least one third viewpoint image and the first viewpoint image.

According to the embodiments of the present disclosure, the number of the second viewpoint images is the same as the number of the third viewpoint images.

According to the embodiments of the present disclosure, the number of the second viewpoint images and the number of the third viewpoint images are both multiple, parallaxes between different second viewpoint images and the first viewpoint image are different, and parallaxes between different third viewpoint images and the first viewpoint image are different.

According to the embodiments of the present disclosure, the determining, for at least one of the pixel islands, a center sub-pixel from a plurality of sub-pixels in the pixel island according to a positional relationship between the viewing position and at least one sub-pixel in the pixel island, includes:
determining an angular relationship between the viewing position and the pixel island according to a positional relationship between the viewing position and the pixel island;
acquiring an angular spectrum of at least one sub-pixel in the pixel island from an angular spectrum library;

determining a sub-pixel matched with the viewing position from a plurality of sub-pixels of the pixel island according to the angular spectrum of at least one sub-pixel and the angular relationship; and using the determined sub-pixel as the center sub-pixel.

According to the embodiments of the present disclosure, the driving other sub-pixels in at least one of the pixel islands to display according to the parallax image set, so as to form a target display picture, includes:

determining, for at least one sub-pixel among other sub-pixels in the at least one pixel island, a viewpoint image matched with the sub-pixel from the parallax image set according to a preset layout rule; and driving the sub-pixel to display according to the determined viewpoint image.

According to the embodiments of the present disclosure, among other sub-pixels of the at least one pixel island, at least one sub-pixel is matched with at least one viewpoint image, and different sub-pixels are matched with different viewpoint images.

According to the embodiments of the present disclosure, the display method further includes:

acquiring viewpoint index numbers of a plurality of sub-pixels in at least one of the pixel islands;

sorting the acquired viewpoint index numbers to form a viewpoint index number sequence;

wherein the determining, for at least one sub-pixel among other sub-pixels in the at least one pixel island, a viewpoint image matched with the sub-pixel from the parallax image set according to a preset layout rule, includes:

determining a viewpoint image matched with a viewpoint index number from the parallax image set according to a positional relationship between viewpoint index numbers of other sub-pixels and a viewpoint index number of the center sub-pixel in the index number sequence; and determining a sub-pixel matched with at least one viewpoint index number according to a preset mapping rule, and using the viewpoint image matched with the viewpoint index number as a viewpoint image matched with the sub-pixel.

According to the embodiments of the present disclosure, the parallax image set is the parallax image set according to claim 5; the user includes a first observation eye and a second observation eye, and the viewing position is located the between the first observation eye and the second observation eye;

the determining a viewpoint image matched with the viewpoint index number from the parallax image set according to a positional relationship between viewpoint index numbers of other sub-pixels and a viewpoint index number of the center sub-pixel in the index number sequence, includes:

dividing remaining viewpoint index numbers into a first viewpoint index number group corresponding to the first observation eye and a second viewpoint index number group corresponding to the second observation eye according to a position of the viewpoint index number of the center sub-pixel in the index number sequence; and determining a viewpoint image matched with the viewpoint index number in the first viewpoint index number group from the plurality of second viewpoint images; and determining a viewpoint image matched with the viewpoint index number in the second viewpoint index number group from the plurality of third viewpoint images.

According to the embodiments of the present disclosure, for the first viewpoint index number group, when the viewpoint index numbers of the first viewpoint index number group include first n viewpoint index numbers and last m viewpoint index numbers in the viewpoint index number sequence, determining a viewpoint image matched with the viewpoint index number in the first viewpoint index number group from the plurality of second viewpoint images according to a preset first shift and extension rule; and for the second viewpoint index number group, when the viewpoint index numbers of the second viewpoint index number group include first n viewpoint index numbers and last m viewpoint index numbers in the view index number sequence, determining a viewpoint image matched with the viewpoint index number in the second viewpoint index number group from the plurality of third viewpoint images according to a preset second shift and extension rule, wherein the shift and extension directions of the first shift and extension rule and the second and shift extension rule are opposite.

According to the embodiments of the present disclosure, the display method further includes establishing an image source library, and the establishing an image source library includes:

establishing a virtual camera array, wherein the virtual camera array takes $\delta\theta$ as a first acquisition step size and $\Delta\theta$ as a second acquisition step size;

wherein, the $\delta\theta$ is a projected angle of each sub-pixel, and the $\Delta\theta$ is a preset angle positioning accuracy; and collecting an image of a target object by using the virtual camera array to construct the image source library.

According to the embodiments of the present disclosure, the display method further includes establishing an angle spectrum library, and the establishing an angle spectrum library includes:

acquiring, for at least one of the pixel islands, angular spectra of a plurality of sub-pixels in the pixel island to obtain a plurality of initial angular spectra;

processing each initial angular spectrum according to boundaries of the plurality of initial angular spectra to obtain a plurality of target angular spectra; and constructing the angular spectrum library based on the plurality of target angular spectra.

Another aspect of the present disclosure further provides a display device, the display device includes a plurality of pixel islands, at least one pixel island includes a plurality of sub-pixels, the display device further includes a processing module configured to:

acquire a viewing position of a user;

determine a viewpoint image matched with the viewing position from an image source library to obtain a first viewpoint image;

determine a plurality of viewpoint images having parallax with the first viewpoint image from the image source library to obtain a parallax image set;

determine, for at least one of the pixel islands, a center sub-pixel from a plurality of sub-pixels in the pixel island according to a positional relationship between the viewing position and at least one sub-pixel in the pixel island; and drive the center sub-pixel in at least one of the pixel islands to display according to the first viewpoint image, and drive other sub-pixels in the at least one of the pixel islands to display according to the parallax image set, so as to form a target display picture, wherein the target display picture is configured to enable the user to see a three-dimensional image corresponding to the first viewpoint image when viewing the display device at the viewing position According to the embodiments of the present disclosure, the display device further includes an optical path adjustment structure; the optical path adjustment structure is configured such that light emitted from the at least one pixel island forms a plurality of consecutive views on a preset projection plane after passing through the light path adjustment structure.

According to the embodiments of the present disclosure, a plurality of sub-pixels of the at least one pixel island are arranged in a first direction, the optical path adjustment structure includes a plurality of lenticular units, each lenticular unit includes a plurality of lenses arranged in the first direction, and each pixel island is covered by a lenticular unit.

According to the embodiments of the present disclosure, sub-pixels in a same pixel island have a same color.

BRIEF DESCRIPTION OF DRAWINGS

The above contents and other objectives, features and advantages of the present disclosure will be more apparent through the following descriptions of embodiments of the present disclosure with reference to the accompanying drawings.

DETAILED DESCRIPTION

Figure 1A:
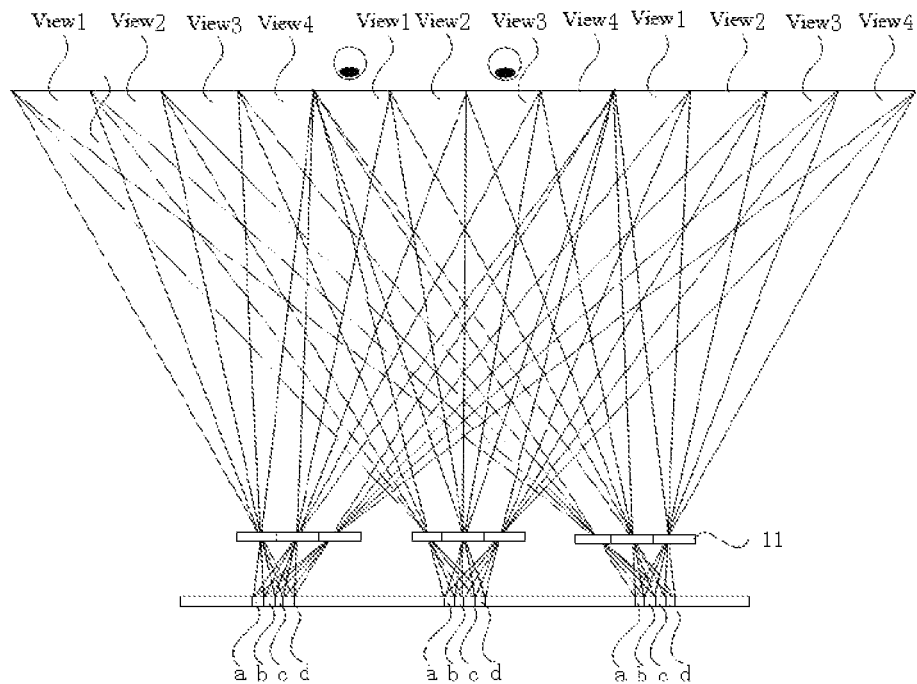
FIG. 1a schematically shows a schematic diagram of a layout effect in an example.

In order to make objectives, technical solutions and advantages of the embodiments of the present disclosure more clear, technical solutions in the embodiments of the present disclosure will be described clearly and completely with reference to the accompanying drawings. It is obvious that the embodiments described are only some embodiments of the present disclosure, rather than all embodiments. All other embodiments, which may be derived by those of ordinary skill in the art from the embodiments in the present disclosure without creative labor, are intended to be within the scope of the present disclosure.

It should be noted that in the accompanying drawings, a size and relative size of elements may be exaggerated for purposes of clarity and/or description. As such, the size and relative size of various elements are not necessarily limited to those shown in the figures. In the description and the drawings, the same or similar reference signs denote the same or similar parts.

When an element is described as being "on", "connected to" or "coupled to" another element, the element may be directly on, connected or coupled to the another element or an intervening element may be present. However, when an element is described as being "directly on", "directly connected to" or "directly coupled to" another element, there is no intervening element. Other terms and/or expressions used to describe a relationship between elements should be interpreted in a similar manner, such as, "between . . . and" versus "directly between . . . and", "adjacent" versus "directly adjacent" or "on" versus "directly on", etc. Moreover, a term "connection" may refer to a physical connection, an electrical connection, a communication connection, and/or a fluid connection. Furthermore, X, Y, and Z axes are not limited to three axes of a rectangle coordinate system, and may be interpreted in a broader sense. For example, X, Y, and Z axes may be perpendicular to each other, or may represent different directions that are not perpendicular to each other. For purposes of the present disclosure, "at least one of X, Y and Z" and "at least one selected from a group consisting of X, Y and Z" may be interpreted as X only, Y only, Z only, or any combination of two or more of X, Y and Z, such as XYZ, XYY, YZ and ZZ. As used herein, a term "and/or" includes any and all combinations of one or more of related items listed.

It should be noted that, although terms "first", "second", etc. may be used herein to describe various parts, components, elements, regions, layers and/or sections, these parts, components, elements, regions, layers and/or sections should not be limited by these terms. Rather, these terms are used to distinguish one part, component, element, region, layer or section from another. Thus, for example, a first part, a first component, a first element, a first region, a first layer, and/or a first section discussed below could be termed a second part, a second component, a second element, a second region, a second layer, and/or a second section without departing from teachings of the present disclosure.

For convenience in description, spatial relationship terms, such as "upper", "lower", "left", "right" and the like, may be used herein to describe a relationship between one element or feature and another element or feature as illustrated in the figures. It will be understood that the spatial relationship terms are intended to encompass different orientations of a device in use or operation in addition to an orientation depicted in the figures. For example, if the device in the figures is turned over, elements described as "below" or "beneath" other elements or features would then be oriented "above" or "over" other elements or features.

Those skilled in the art should understand that, unless otherwise specified, the expression "thickness" refers to a dimension along a surface of each film layer arranged perpendicular to a display substrate, i.e., a dimension along a light-exiting direction of the display substrate.

Herein, unless otherwise specified, the expression "patterning process" generally includes steps of photoresist coating, exposure, development, etching, photoresist stripping, and the like. The expression "one-shot patterning process" means a process of forming a patterned layer, member, component, or the like using one mask.

It should be noted that the expression "a same layer", "arranged in a same layer" or a similar expression refers to a layer structure formed by forming a film layer for forming a specific pattern by using the same film formation process and then patterning the film layer by the one-shot patterning process using the same mask. Depending on the specific pattern, the one-shot patterning process may include a plurality of exposure, development or etching processes, and the specific pattern in the formed layer structure may be continuous or discontinuous. The specific pattern may also be at different heights or have different thicknesses.

Herein, unless otherwise stated, the expression "electrically connected" may mean that two parts or elements are directly electrically connected, for example, part or element A is in direct contact with part or element B, and an electrical signal may be transmitted between the two; the expression also may mean that two parts or elements are electrically connected through a conductive medium such as a conductive wire, for example, part or element A is electrically connected to part or element B through a conductive wire to transmit an electrical signal between the two parts or elements; the expression also may mean that two parts or elements are electrically connected through at least one electronic component, for example, part or element A is electrically connected to part or element B through at least one thin film transistor to transmit an electrical signal between the two parts or elements.

As shown in FIG. 1a, in this example, a plurality of sub-pixels (sub-pixel a, sub-pixel b, sub-pixel c, and sub-pixel d) are provided in a display device, and the plurality of sub-pixels are divided into a plurality of groups, each group including a plurality of sub-pixels. The display device is also provided with an optical path adjustment structure 11, and the optical path adjustment structure 11 is configured to project the light emitted from sub-pixels of a same group to a same position, and to project the light emitted from sub-pixels of different groups to different positions. For example, the light emitted by the sub-pixel a in the display device is projected to the position of view 1, the light emitted by the sub-pixel b is projected to the position of view 2, the light emitted by the sub-pixel c is projected to the position of view 3, and the light emitted by the sub-pixel d is projected to the position of view 4, thereby forming a continuous view, so that when the human eye is at a position shown in FIG. 1a to view the display device, a three-dimensional image may be seen. In this way, the light emitted from each sub-pixel may be accurately projected to a designated position, and a requirement on the precision of the optical path adjustment structure 11 is high.

Figure 1B:
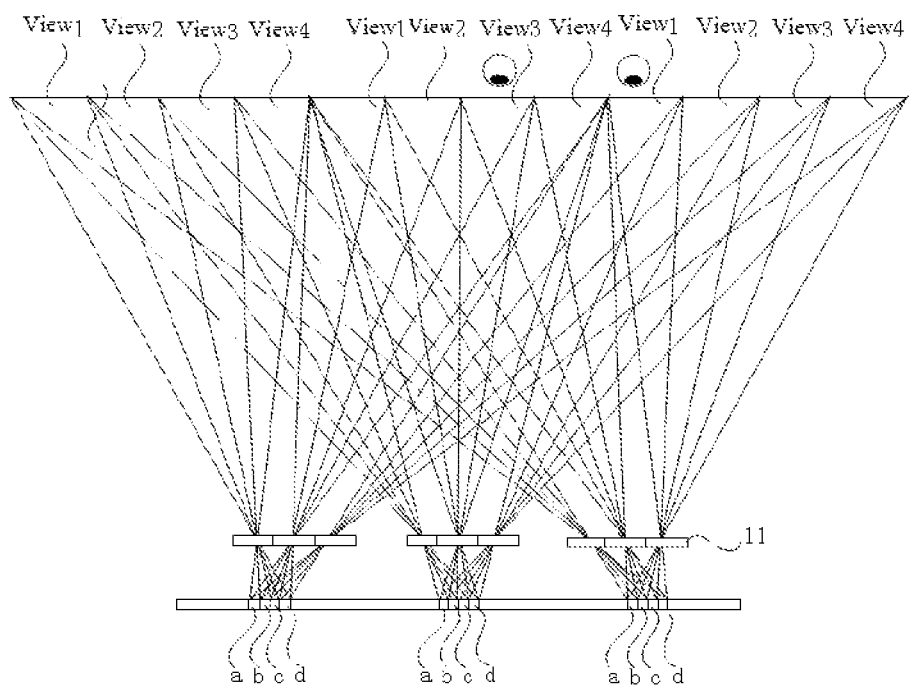
FIG. 1b schematically shows another schematic diagram of a layout effect in an example.

FIG. 1b schematically shows another second schematic diagram of a layout effect in an example. As shown in FIG. 1b, after the human eye moves to the position shown in FIG. 1b, the human's left eye is at the position of view 3, the human's right eye is at the position of view 1, and compared with FIG. 1a, the view viewed by the left and right eyes is opposite, so that reverse vision occurs, resulting in an erroneous visual experience.

In another example, a problem of reverse vision may be solved by eye tracking technology. Through eye tracking technology, the position of the human eye, i.e., a position of reporting point, may be located. Then, the display content may be adjusted according to the position of reporting point. For example, when the human eye moves to the position shown in FIG. 1b, the display content of the two sub-pixels corresponding to view 1 and view 3 is exchanged, so that the positions of view 1 and view 3 are exchanged, so as to solve the problem of reverse vision.

However, the inventor found during research that the display device in the above example still has the following problems.

First, due to an error of reporting point in eye tracking technology, when the human eye is stationary, the reporting point may shake, which may cause a parallax of the image viewed by the two eyes to shake, resulting in an erroneous visual experience. Secondly, since the layout is still performed in a fixed sequence in this example, when solving the problem of reverse vision, only the positions of view 1 and view 3 are exchanged. Therefore, the stereoscopic visions of the human eye at the position shown in FIG. 1a and the position shown in FIG. 1b are the same, and there is a lack of motion time difference. For example, for a human face image, the human eye at both the position shown in FIG. 1a and the position shown in FIG. 1b see the front face of the human and may not see the side face of the human. Finally, as shown in FIG. 1a and FIG. 1b, the distances between view 1 to view 4 and the position of the display device are fixed, which means that the user may only have a correct three-dimensional visual experience at a fixed viewing distance, and the viewing distance is greatly restricted.

Figure 2A:
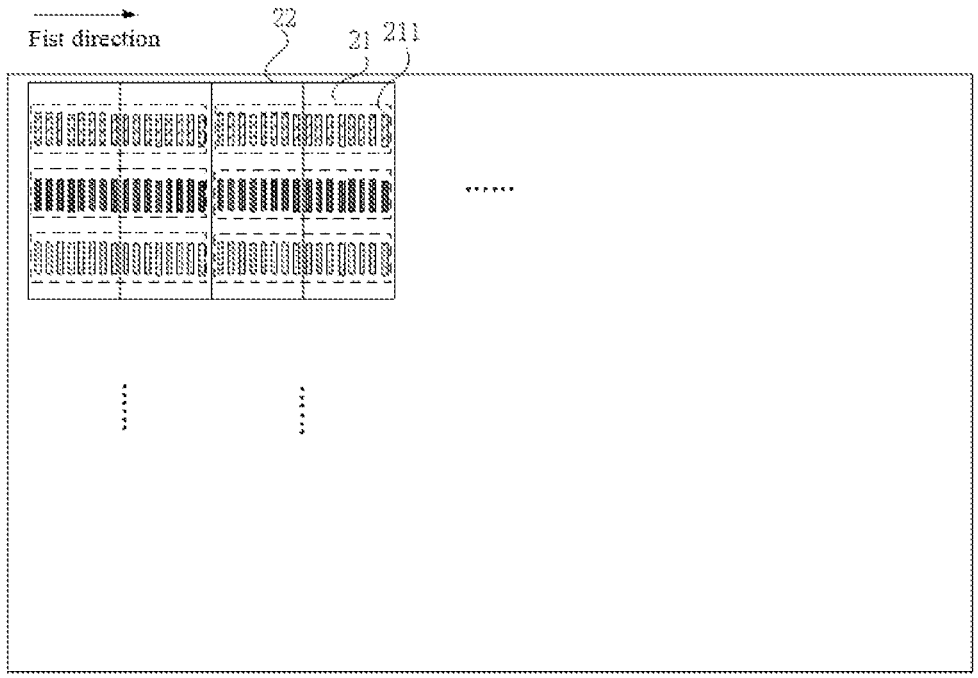
FIG. 2a schematically shows a schematic diagram of a display device in the embodiments of the present disclosure.

In view of the above, the embodiments of the present disclosure provide a display method, applied to a display device. FIG. 2 schematically shows a schematic diagram of the display device in the embodiments of the present disclosure. As shown in FIG. 2a, the display device includes a plurality of pixel islands 21. At least one pixel island 21 includes a plurality of sub-pixels 211, optionally, each pixel island 21 includes a plurality of sub-pixels 211, and the plurality of sub-pixels 211 in each pixel island 21 are arranged in a first direction, and the plurality of sub-pixels 211 in each pixel island 21 have a same color. The first direction may refer to a horizontal direction in FIG. 2a.

Figure 2B:
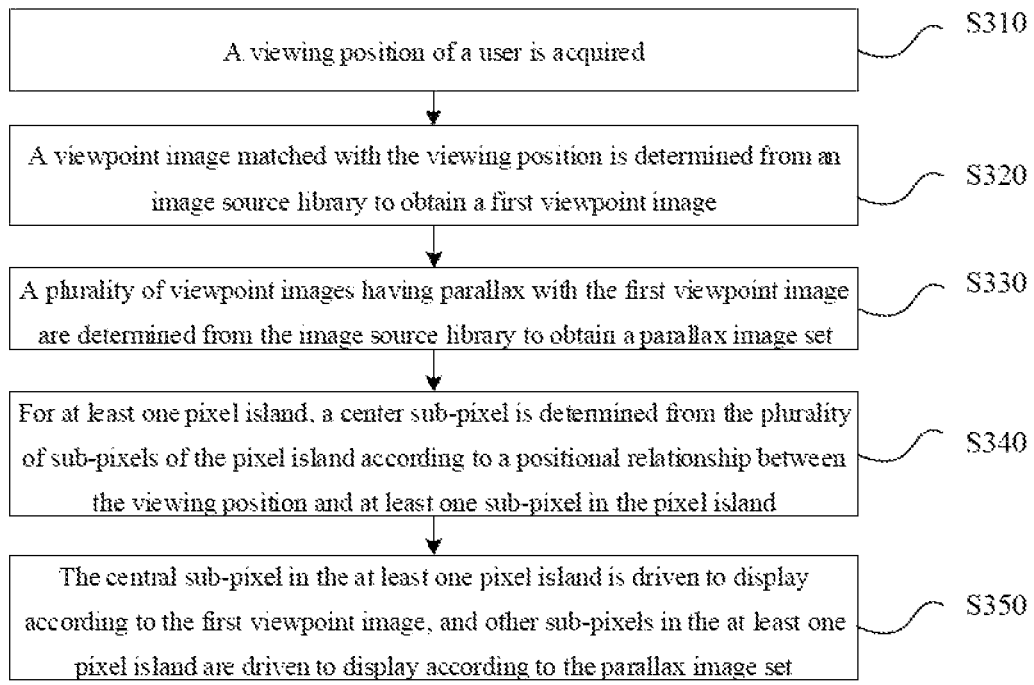
FIG. 2b schematically shows a flowchart of a display method in the embodiments of the present disclosure.

FIG. 2b schematically shows a flowchart of a display method in the embodiments of the present disclosure. As shown in FIG. 2b, the display method in the embodiments of the present disclosure includes step S210 to step S250.

In step S210, a viewing position of a user is acquired.

In the embodiments of the present disclosure, the viewing position may be obtained through eye tracking technology, and the viewing position may specifically refer to a position that may characterize the user's eyes. Optionally, the viewing position may be a midpoint between the user's eyes, such as between the eyebrows. The obtained viewing position may include coordinates, and the position of the viewing position in a three-dimensional space may be represented by the coordinates.

In step S220, a viewpoint image matched with the viewing position is determined from an image source library to obtain a first viewpoint image.

In the embodiments of the present disclosure, the image source library may be pre-configured. For example, the viewpoint images may be images obtained by capturing images of a target object through a virtual camera array, and different viewpoint images have different capturing angles of view. Optionally, the capturing angles of view may be configured according to possible viewing positions of the user, so that one viewing position may match at least one viewpoint image, and different viewing positions may match viewpoint images of different angles of view. For example, the user may view the display device directly or laterally. For the face image, when the user is directly opposite the display device, the viewpoint image matched with the user's viewing position may be the front of the face; when the user moves to the left or right, the viewpoint image matched with the viewing position of the user may be the side of the face.

In step S230, a plurality of viewpoint images having parallax with the first viewpoint image are determined from the image source library to obtain a parallax image set.

In the embodiments of the present disclosure, any two of the plurality of viewpoint images may have a preset parallax, and the preset parallax is configured to enable the continuous plurality of viewpoint images to achieve a three-dimensional display effect. The number of viewpoint images having parallax with the first viewpoint image selected from the image source library and the size of the parallax may be specifically determined according to actual needs, which is not limited in the embodiments of the present disclosure, as long as the finally obtained viewpoint images in the parallax image set may be combined with the first viewpoint image to realize three-dimensional display.

In step S240, for at least one pixel island 21, a center sub-pixel 211 is determined from the plurality of sub-pixels 211 of the pixel island 21 according to a positional relationship between the viewing position and at least one sub-pixel 211 in the pixel island 21.

Figure 6:
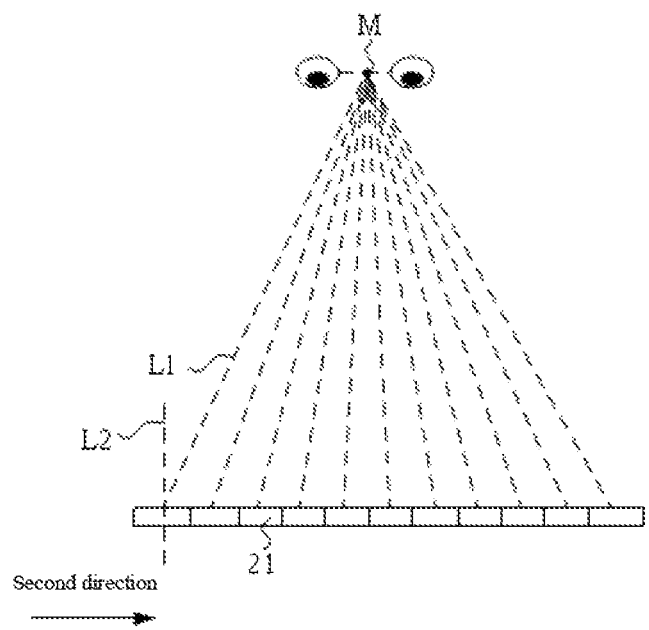
FIG. 6 schematically shows a schematic diagram of a viewing position and a pixel island in the embodiments of the present disclosure.

In the embodiments of the present disclosure, the display device includes a plurality of pixel islands 21. For example, as shown in FIG. 6, the display device may include a plurality of pixel islands 21 arranged in a second direction, and the positional relationship between the viewing position and the plurality of pixel islands 21 is different.

In the embodiments of the present disclosure, according to the positional relationship between the viewing position and each sub-pixel 211 in the pixel island 21, one sub-pixel 211 that has a greater influence on the viewing position may be selected as the center sub-pixel 211. Taking one pixel island 21 as an example, in the pixel island 21, a certain sub-pixel 211 is directly opposite the viewing position, and the content displayed by the sub-pixel 211 is dominant compared with the content displayed by other sub-pixels 211 in the pixel island 21. Hence, the sub-pixel 2115 may be used as the center sub-pixel 211. It should be noted that the above content only takes "directly opposite" as an example to schematically describe a process of selecting the center sub-pixel 211, and is not intended to limit the method of selecting the center sub-pixel 211. For example, in some embodiments, the center sub-pixel 211 may be determined according to an included angle between the viewing position and the pixel island 21 and an angular spectrum of each sub-pixel 211 in the pixel island 21, which will be described in detail below, and will not be described herein.

In step S250, the center sub-pixel 211 in the at least one pixel island 21 is driven to display according to the first viewpoint image, and other sub-pixels 211 in the at least one pixel island 21 are driven to display according to the parallax image set, so as to form a target display picture. The target display picture is configured to enable the user to see a three-dimensional image corresponding to the first viewpoint image when viewing the display device at the viewing position.

Figure 3A:
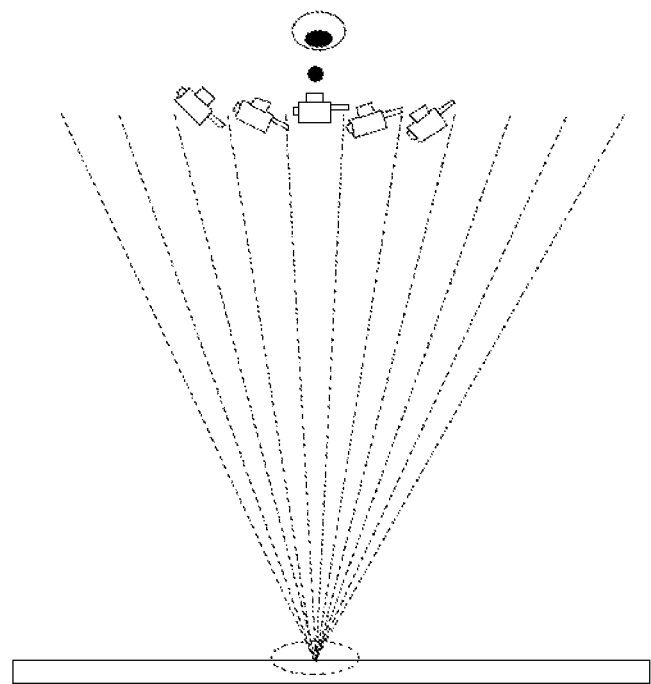
FIG. 3a to FIG. 3d schematically show a schematic diagram of a display effect of the display method according to the embodiments of the present disclosure.
Figure 3B:
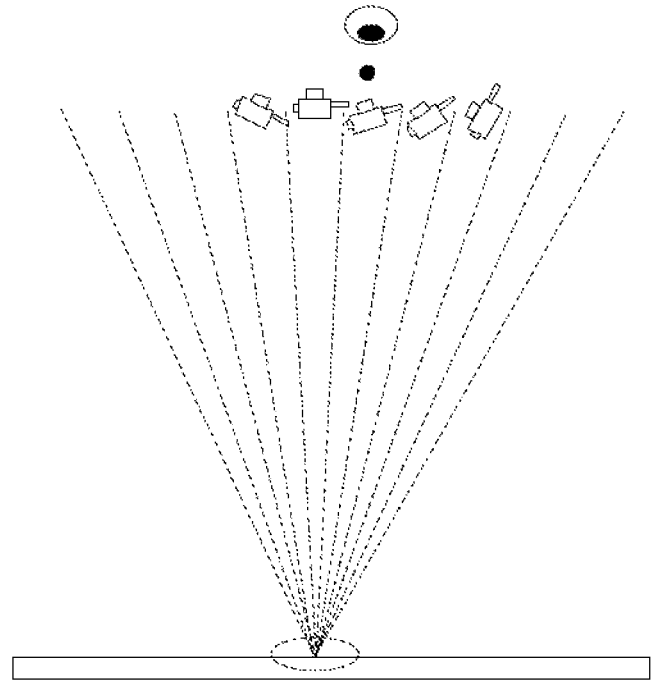
Figure 3C:
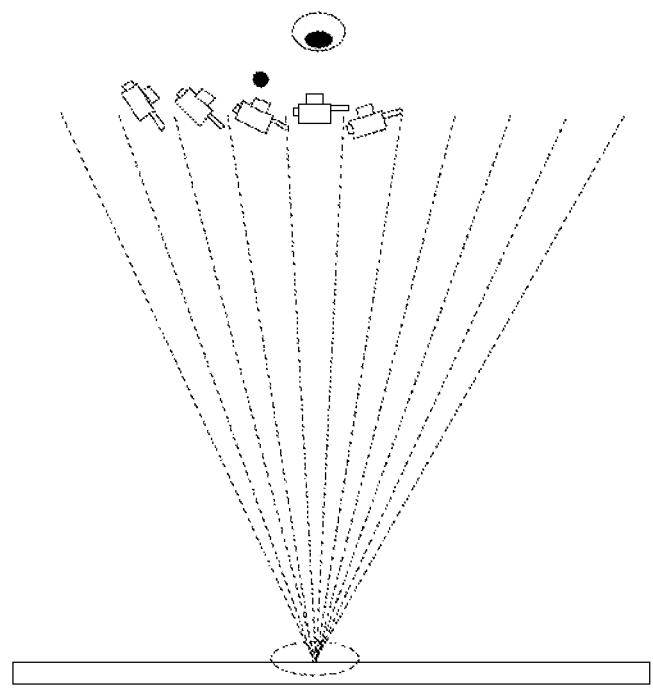

Since the display method of the embodiments of the present disclosure may determine the center sub-pixel of each pixel island 21 according to the viewing position of the user, and then select a matching viewpoint image for each sub-pixel of each pixel island 21 around the center sub-pixel, and the viewing position obtained by eye tracking technology may be any position in the three-dimensional space, the layout of each pixel island for the viewing position may achieve a three-dimensional visual experience effect at any position, so that the user's viewing distance may be not limited, and the viewing experience may be improved. FIG. 3a to FIG. 3d schematically show a schematic diagram of a display effect of the display method according to the embodiments of the present disclosure. As shown in FIG. 3a and FIG. 3b, with the display method of the embodiments of the present disclosure, since the first viewpoint image is matched with the user's viewing position, when the user moves, the first viewpoint image changes accordingly, that is, the angle of view of the target display picture also changes accordingly. For example, taking a kettle as an example, when the user views the display device from the front, he may see the front of the kettle; and when the user moves to the left or right, he may see the sides of the kettle, so as to achieve continuous motion parallax. As shown in FIG. 3a and FIG. 3c, in the embodiments of the present disclosure, the display may be performed through the first viewpoint image in conjunction with the parallax image set, so that even if a reporting error occurs during eye tracking (the eyeball does not move, but the reporting point jitters), by displaying the viewpoint images in the parallax image set, the parallax jitter of the images viewed by the user may be avoided, and the erroneous visual experience caused by the jitter may be improved.

Figure 3D:
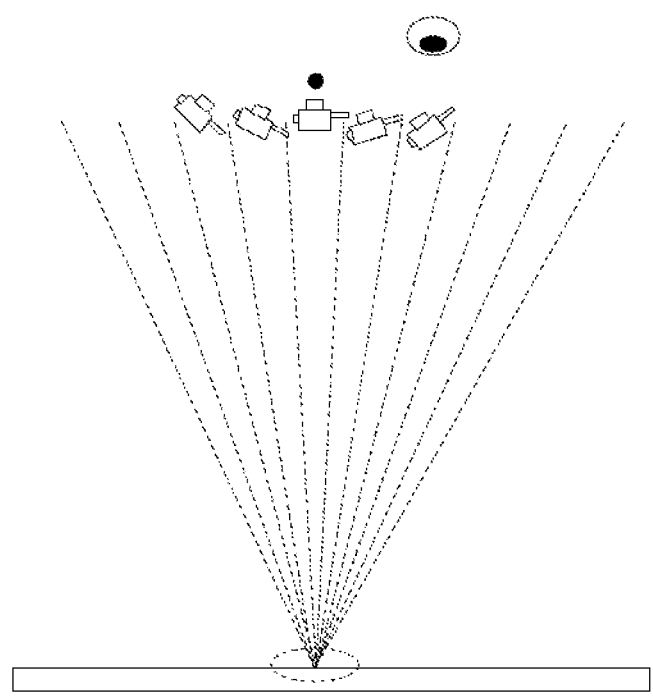

Moreover, in some cases, the reporting point delay (the eyeball moves, but the reporting point does not move) may also occur during eye tracking. As shown in FIG. 3a and FIG. 3d, with the display method of the embodiments of the present disclosure, even if the reporting point does not move, the user may also see a correct image by displaying the images in the parallax image set, thereby avoiding a visual error caused by the reporting point delay. Furthermore, by using the display method of the embodiments of the present disclosure, the center sub-pixel 211 in each pixel island 21 may be determined in real time according to a change of an viewing position, and then a corresponding layout may be performed to realize a dynamic layout, thereby replacing the fixed layout method adopted in FIG. 1a and FIG. 1b. Hence, a precision requirement on the optical structure may also be reduced.

The display method of the embodiments of the present disclosure will be described in detail below with reference to FIG. 2a to FIG. 12.

In some embodiments, a reference point may be configured in the display area of the display device. Step S220 includes step S221 to step S222.

In step S221, according to a position difference between the viewing position and the reference point, a visual area matched with the viewing position is determined from a preset visual area distribution map to obtain a first visual area.

Figure 4A:
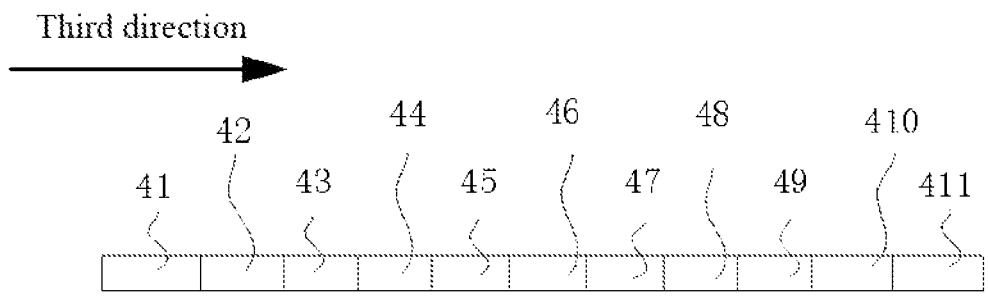
FIG. 4a schematically shows a schematic diagram of a visual area distribution map in the embodiments of the present disclosure.
Figure 4B:
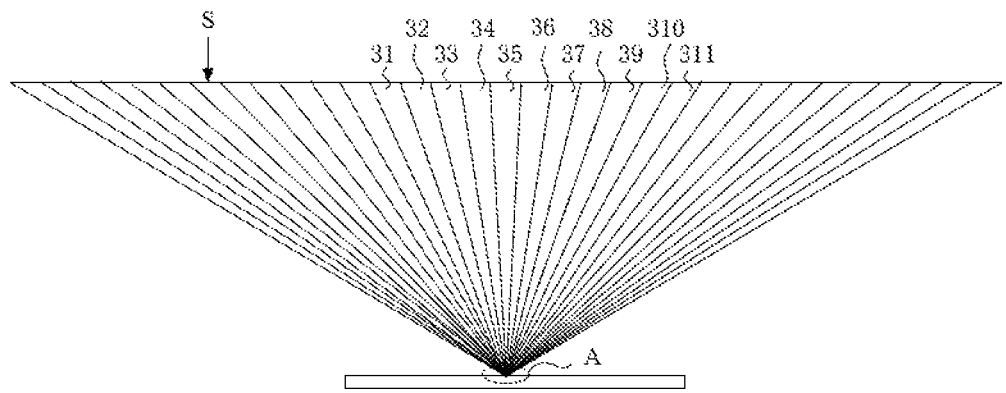
FIG. 4b schematically shows a schematic diagram of a light path of the display device in the embodiments of the present disclosure.
Figure 4C:
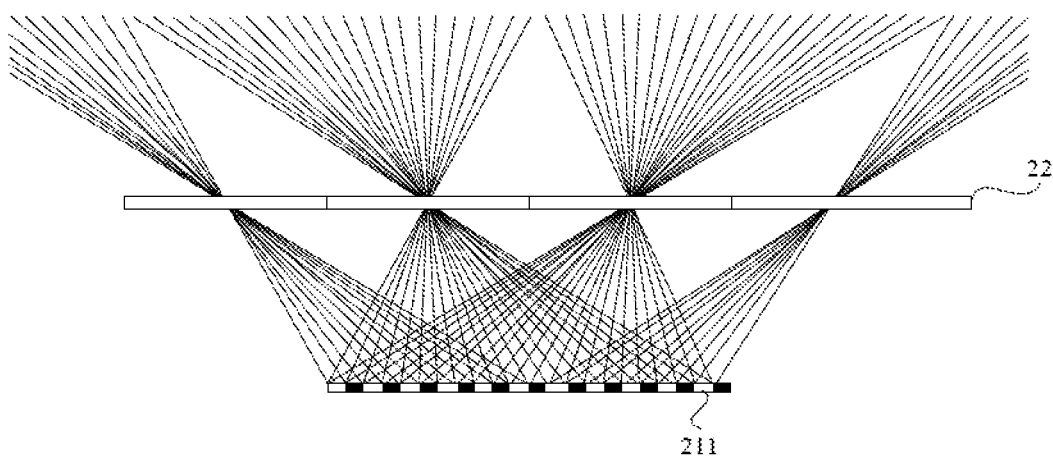
FIG. 4c schematically shows a schematic diagram at position A in FIG. 4b.

In the embodiments of the present disclosure, the visual area distribution map may be configured corresponding to the position on which the light emitted from the pixel island 21 may be projected. The visual area distribution map is described below by taking one pixel island 21 as an example. Specifically, FIG. 4a schematically shows a schematic diagram of a visual area distribution map in the embodiments of the present disclosure. As shown in FIG. 4a, the visual area distribution map includes visual area 41 to visual area 411 continuously arranged in a third direction. FIG. 4b schematically shows one of the schematic diagrams of a light path of the display device in the embodiments of the present disclosure. FIG. 4c schematically shows a schematic diagram at position A in FIG. 4b. As shown in FIG. 2, FIG. 4a to FIG. 4c, the display device is further provided with an optical path adjustment structure 22, and the optical path adjustment structure 22 may include a lenticular lens. The light path adjustment structure may be configured such that after the light emitted from the pixel island 21 passes through the light path adjustment structure 22, a plurality of consecutive view 31 to view 311 corresponding to visual area 41 to visual area 411 are formed on a preset projection surface S. Optionally, view 31 to view 311 are arranged in a one-to-one correspondence with visual area 41 to visual area 411. The preset projection surface S may refer to one or more planes parallel to the display surface of the display device, and the embodiments of the present disclosure does not limit the number of preset projection surfaces.

In some embodiments, step S221 includes the following steps.

In S2211, an angle coordinate of the viewing position relative to the reference point is determined according to a preset angle coordinate system, wherein the preset angle coordinate system is an angle coordinate system established according to the reference point and a plane where the display area is located.

In S2212, a visual area matched with the angle coordinate is determined from the preset visual area distribution map to obtain the first visual area.

In some embodiments, the position of the reference point may be determined according to actual needs. For example, the reference point may be set at a top corner of the display area of the display device, or may be set at a center of the display area.

For example, the reference point may be located in the center of the display area, and at this point, the preset angle coordinate system may take the reference point as an origin.

Figure 5:
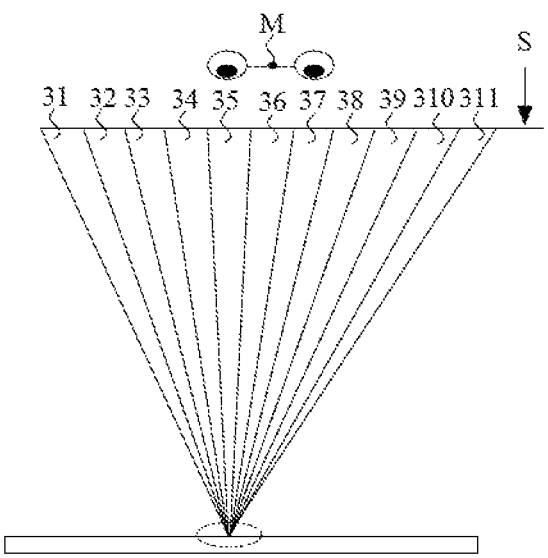
FIG. 5 schematically shows a schematic diagram of determining a viewing position according to the embodiments of the present disclosure.

FIG. 5 schematically shows a schematic diagram of determining a viewing position according to the embodiments of the present disclosure. As shown in FIG. 5, in the embodiments of the present disclosure, the viewing position of the user may be acquired first through eye tracking technology. Taking the human eye as an example, firstly, the coordinates of the user's two eyeballs in the preset space are determined, and then, according to the coordinates of the two eyeballs, a coordinate of a midpoint M between the two eyeballs, that is, the viewing position of the user, is determined. Then, according to the coordinate of the midpoint M and a reference point in the display device (e.g., the center of the display area), the angle coordinate ($\theta_H$, $\theta_V$) of the midpoint relative to the center of the display area may be determined.

In some embodiments, the angle coordinate ($\theta_H$, $\theta_V$) may be used to characterize the angular relationship between the viewing position and the reference point. For example, the angle coordinate system includes an x-axis, a y-axis and a z-axis, and $\theta_H$ may be used to characterize an included angle between the line connecting the viewing position and the reference point and the plane where the x-axis and z-axis of the angle coordinate system are located, and Oy may be used to characterize an included angle between the line connecting the viewing position and the reference point and the plane where the y-axis and z-axis of the angle coordinate system are located.

According to the angle coordinate, it may be determined at which view position the midpoint M is located on the preset projection surface S, and then the visual area matched by the midpoint M may be determined, thereby obtaining the first visual area. For example, as shown in FIG. 4a and FIG. 5, the midpoint M is located at the position where view 36 of the preset projection surface S is located. As shown above, visual area 41 to visual area 411 may be arranged in a one-to-one correspondence with view 31 to view 311, that is, the visual area matched with the midpoint M is visual area 46.

In step S222, a viewpoint image matched with the first visual area is extracted from the image source library to obtain the first viewpoint image.

In the embodiments of the present disclosure, each viewpoint image in the image source library may be matched with one or more visual areas, and after a visual area is determined, a corresponding viewpoint image may be determined. Taking a kettle picture as an example, when the first visual area is the visual area 46, the viewpoint image matched with the visual area 46 is the front of the kettle, and at this point, the observer may see the three-dimensional image of the front of the kettle; when the observer moves, the viewing position changes, the first visual area is updated to the visual area 41, and the viewpoint image matched with the visual area 41 is the left side of the kettle, and at this point, the observer may see the three-dimensional image on the left side of the kettle, so as to achieve motion parallax.

In some embodiments, step S230 includes step S231 to step S233.

In step S231, a viewpoint image having a first preset parallax relationship with the first viewpoint image is determined from the image source library to obtain at least one second viewpoint image.

In step S232, a viewpoint image having a second preset parallax relationship with the first viewpoint image is determined from the image source library to obtain at least one third viewpoint image.

In step S233, a parallax image set is constructed by at least one second viewpoint image and at least one third viewpoint image, wherein a parallax between the at least one second viewpoint image and the first viewpoint image is opposite to a parallax between the at least one third viewpoint image and the first viewpoint image.

In the embodiments of the present disclosure, the second viewpoint image and the third viewpoint image may be extracted from the image source library according to the visual area distribution map. For example, the visual area distribution map includes 11 consecutive visual areas, namely visual area 41, visual area 42, visual area 43, visual area 44, visual area 45, visual area 46, visual area 47, visual area 48, visual area 49, visual area 410 and visual area 411. The 11 visual areas may correspond to 11 viewpoint images, and there is a parallax between any two of the 11 viewpoint images. When the visual area matched with the first viewpoint image is visual area 46, 10 viewpoint images matched with visual area 41, visual area 42, visual area 43, visual area 44, visual area 45, visual area 47, visual area 48, visual area 49, and view area 410, and view area 411 may be selected from the image source library, and a part of the 10 viewpoint images may be selected as the second viewpoint image, and the other part may be selected as the third viewpoint image.

In some embodiments, the number of the second viewpoint images and the number of the third viewpoint images are multiple, and parallaxes between different second viewpoint images and the first viewpoint image are different, and parallaxes between different third viewpoint images and the first viewpoint image are different.

For example, the visual area distribution map includes the above-mentioned 11 visual areas and 11 viewpoint images matched with the 11 visual areas. When the visual area matched with the first viewpoint image is visual area 46, 5 viewpoint images matched with visual area 41, visual area 42, visual area 43, visual area 44, and visual area 45 may be selected from the image source library, and a part or all of the five viewpoint images may be selected as the second viewpoint image. 5 viewpoint images matched with visual area 47, visual area 48, visual area 49, visual area 410, and visual area 411 may be selected from the image source library, and a part or all of the five viewpoint images may be selected as the third viewpoint image.

In some embodiments, the number of second viewpoint images is the same as the number of third viewpoint images.

For example, the visual area distribution map includes the above-mentioned 11 visual areas and 11 viewpoint images. When the visual area matched with the first viewpoint image is visual area 46, 5 viewpoint images matched with visual area 41, visual area 42, visual area 43, visual area 44, and visual area 45 may be selected from the image source library as the second viewpoint images, and 5 viewpoint images matched with visual area 47, visual area 48, visual area 49, visual area 410, and visual area 411 may be selected from the image source library as the third viewpoint image.

In some embodiments, step S240 includes step S241 to step S244.

In step S241, according to a positional relationship between the viewing position and the pixel island 21, an angular relationship between the viewing position and the pixel island 21 is determined.

For example, the angular relationship may refer to an included angle between the viewing position and the pixel island 21. FIG. 6 schematically shows a schematic diagram of a viewing position and a pixel island in the embodiments of the present disclosure. As shown in FIG. 6, the included angles between the viewing position (i.e. the midpoint M) and the plurality of pixel islands 21 are different, wherein the included angle between the viewing position and the pixel island 21 may refer to, in the plane shown in FIG. 6, the included angle between a connection line L1 between the viewing position and the center of the pixel island 21 and a normal line L2 of the pixel island 21.

In step S242, an angular spectrum of at least one sub-pixel 211 in the pixel island 21 is acquired from the angular spectrum library.

In step S243, according to the angular spectrum of at least one sub-pixel 211 and the angular relationship, a sub-pixel 211 matched with the viewing position is determined from the plurality of sub-pixels 211 of the pixel island 21.

In step S244, the determined sub-pixel 211 is used as the center sub-pixel 211.

For example, the pixel island 21 includes 11 sub-pixels 211, wherein the angular spectrum of the first sub-pixel 211 ranges from 25.5° to 26.5°, the angular spectrum of the second sub-pixel 211 ranges from 26.5° to 27.5°, and the angular spectrum of the third sub-pixel 211 ranges from 28.5° to 29.5°, and so on. The angular spectrum range of each sub-pixel 211 is about 1°. When the included angle between the viewing position and the pixel island 21 is 27°, it may be determined that the second sub-pixel 211 is the center sub-pixel 211.

In some embodiments, step S250 includes: for at least one sub-pixel 211 among other sub-pixels 211 in at least one pixel island 21, step S251 and step S252 are performed.

In step S251, according to a preset layout rule, a viewpoint image matched with the sub-pixel 211 is determined from the parallax image set.

In the embodiments of the present disclosure, a viewpoint image matched with the sub-pixel 211 may be determined from the parallax image set according to a viewpoint index number of the sub-pixel 211.

For example, in some embodiments, the display method further includes step S261 and step S262.

In step S261, the viewpoint index numbers of the plurality of sub-pixels 211 in the at least one pixel island 21 are acquired.

In step S262, the acquired viewpoint index numbers are sorted to form a viewpoint index number sequence. For example, the viewpoint index numbers are sorted according to the size of the viewpoint index numbers to form a viewpoint index number sequence.

Figure 7A:
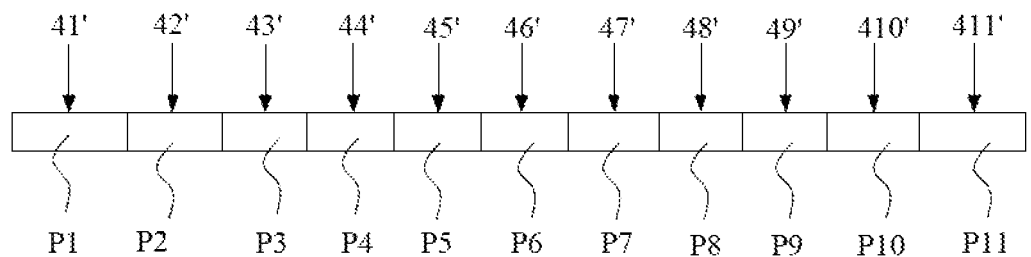
FIG. 7a and FIG. 7b schematically show a schematic diagram of an index number sequence in the embodiments of the present disclosure.
Figure 7B:
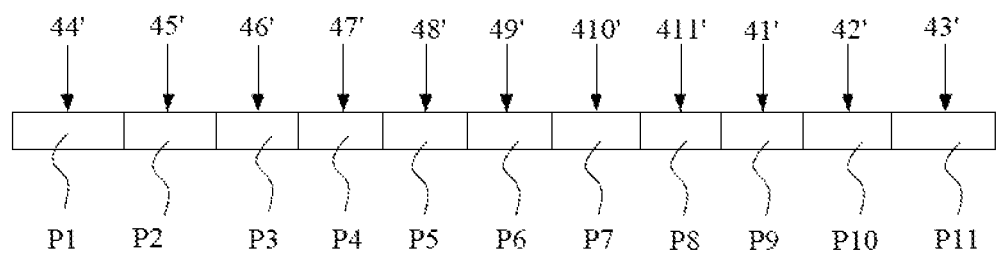
Figure 8:
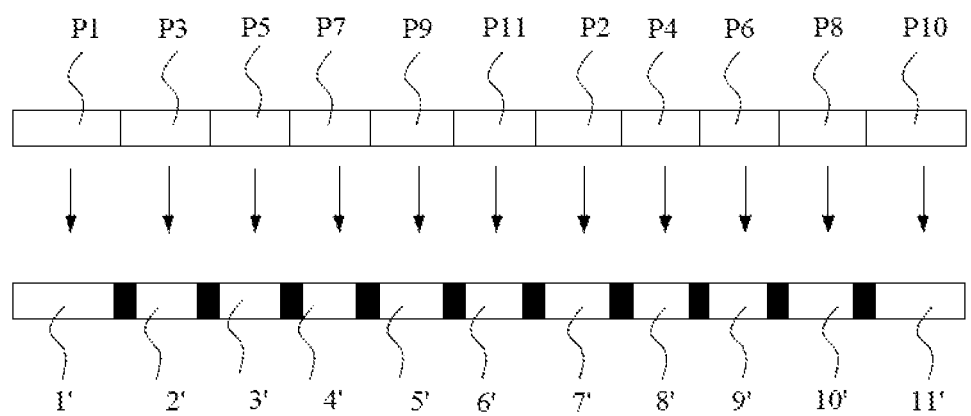
FIG. 8 schematically shows a schematic diagram of viewpoint index numbers and physical positions of sub-pixels in the embodiments of the present disclosure.

In the embodiments of the present disclosure, a position of the viewpoint index number of each pixel in the viewpoint index number sequence may be different from a physical position of the sub-pixel 211 in the pixel island 21, so that the moire effect may be eliminated and the display effect may be improved. For example, the pixel island 21 includes 11 sub-pixels 211. FIG. 7*a* and FIG. 7*b* schematically show a schematic diagram of an index number sequence in the embodiments of the present disclosure. As shown in FIG. 7*a*, the viewpoint index numbers of the 11 sub-pixels 211 are respectively P1 to P11, and a viewpoint index number sequence is formed in ascending order. FIG. 8 schematically shows a schematic diagram of viewpoint index numbers and physical positions of sub-pixels in the embodiments of the present disclosure. As shown in FIG. 8, in the pixel island 21, the sub-pixels 211 are sorted in a way different from that in the viewpoint index number sequence. For example, the sub-pixel 211 with the viewpoint index number P1 is located at position 1', the sub-pixel 211 with the viewpoint index number P2 is located at the position 7', the sub-pixel 211 with the viewpoint index number P3 is located at the position 2', the sub-pixel 211 with the viewpoint index number P4 is located at position 8', the sub-pixel 211 of the viewpoint index number P5 is located at the position 3', the sub-pixel 211 of the viewpoint index number P6 is located at the position 9', the sub-pixel 211 of the viewpoint index number P7 is located at the position 4', the sub-pixel 211 with the viewpoint index number P8 is located at position 10', the sub-pixel 211 with the viewpoint index number P9 is located at position 5', the sub-pixel 211 with the viewpoint index number P10 is located at position 11', and the sub-pixel 211 with the viewpoint index number P11 is located at position 6'.

In some embodiments, step S251 includes step S2511 and step S2512.

In step S2511, according to a positional relationship between the viewpoint index numbers of other sub-pixels and the viewpoint index number of the center sub-pixel 211 in the index number sequence, a viewpoint image matched with a viewpoint index number is determined from the parallax image set.

For clarity, the viewpoint index number of the center sub-pixel 211 in the pixel island 21 is hereinafter referred to as a first index number, and the viewpoint index numbers of other sub-pixels 211 are referred to as a second index number.

In some embodiments, the user includes a first observation eye and a second observation eye, and an viewing position is located between the first observation eye and the second observation eye.

Step S2511 includes step S25111 to step S25112.

In step S25111, according to a position of the viewpoint index number of the center sub-pixel 211 in the index number sequence, remaining viewpoint index numbers are divided into a first viewpoint index number group corresponding to the first observation eye and a second viewpoint index number group corresponding to the second observation eye.

For example, in the embodiments of the present disclosure, a plurality of second index numbers located before the first index number may be taken to form the first viewpoint index number group, and a plurality of second index numbers located after the first index number may be taken to form the second viewpoint index number group, which will be described in detail below, and will not be described herein.

In step S25112, a viewpoint image matched with the viewpoint index number in the first viewpoint index number group is determined from the plurality of second viewpoint images. A viewpoint image matched with the viewpoint index number in the second viewpoint index number group is determined from the plurality of third viewpoint images.

As shown in FIG. 4a and FIG. 7a, the viewpoint index number P6 is set as the first index number, the viewpoint index numbers P1 to P5 are set as a first index number group, the viewpoint index numbers P7 to P11 are set as a second index number group, the visual area matched with the first viewpoint image is set as visual area 46, the visual areas matched with the viewpoint images in the plurality of second viewpoint images are set as visual area 41 to visual area 45, respectively, and the visual areas matched with the viewpoint images in the plurality of third viewpoint images are set as visual area 47 to visual area 411, respectively. At this point, the viewpoint image 46' matched with the visual area 46 may be matched as the first viewpoint image to viewpoint index number P6, the viewpoint image 41' matched with the visual area 41 may be matched to viewpoint index number P1, and the viewpoint image 42' matched with the visual area 42 may be matched to viewpoint index number P2, the viewpoint image 43' matched with the visual area 43 is matched to the viewpoint index number P3, and the viewpoint image 44' matched with the visual area 44 is matched to the viewpoint index number P4, the viewpoint image 45' matched with the visual area 45 is matched to the viewpoint index number P5, the viewpoint image 47' matched with the visual area 47 is matched to the viewpoint index number P7, the viewpoint image 48' matched with the visual area 48 is matched to the viewpoint index number P8, the viewpoint image 49' matched with the visual area 49 is matched to the viewpoint index number P9, the viewpoint image 410' matched with the visual area 410 is matched to the viewpoint index number P10, and the viewpoint image 411' matched with the visual area 411 is matched to the viewpoint index number P11.

In some embodiments, for the first viewpoint index number group, when the viewpoint index numbers of the first viewpoint index number group include the first n viewpoint index numbers and the last m viewpoint index numbers in the viewpoint index number sequence, a viewpoint image matched with the viewpoint index number in the first viewpoint index number group is determined from the plurality of second viewpoint images according to a preset first shift and extension rule.

For the second viewpoint index number group, when the viewpoint index numbers of the second viewpoint index number group include the first n viewpoint index numbers and the last m viewpoint index numbers in the viewpoint index number sequence, a viewpoint image matched with the viewpoint index number in the second viewpoint index number group is determined from the plurality of third viewpoint images according to a preset second shift and extension rule.

The shift and extension directions of the first shift and extension rule and the second shift and extension rule are opposite.

For example, as shown in FIG. 4a and FIG. 7b, the visual area matched with the first viewpoint image is set as visual area 46, and the visual areas matched with the viewpoint images in the plurality of second viewpoint images are set as visual area 41 to visual area 45 respectively, the visual areas matched with the viewpoint images in the plurality of third viewpoint images are set as visual area 47 to visual area 411, respectively. At this point, the viewpoint image 46' matched with the visual area 46 may be matched as the first viewpoint image to the viewpoint index number P3, the viewpoint image 41' matched with visual area 41 may be matched to the viewpoint index number P9, the viewpoint image 42' matched with visual area 42 may be matched to the viewpoint index number P10, the viewpoint image 43' matched with visual area 43 may be matched to the viewpoint index number P11, the viewpoint image 44' matched with visual area 44 may be matched to the viewpoint index number P1, the viewpoint image 45' matched with visual area 45 may be matched to the viewpoint index number P2, the viewpoint image 47' matched with visual area 47 may be matched to the viewpoint index number P4, the viewpoint image 48' matched with visual area 48 may be matched to the viewpoint index number P5, the viewpoint image 49' matched with visual area 49 may be matched to the viewpoint index number P6, the viewpoint image 410' matched with visual area 410 may be matched to the viewpoint index number P7, and the viewpoint image 411' matched with visual area 411 may be matched to the viewpoint index number P8.

In some embodiments, among other sub-pixels 211 of at least one pixel island 21, one sub-pixel 211 may be matched with one viewpoint image, and viewpoint images matched with at least two sub-pixels 211 may be different. For example, at least one sub-pixel 211 is matched with at least one viewpoint image, and the viewpoint images matched with different sub-pixels 211 are different.

In step S2512, according to a preset mapping rule, the sub-pixel 211 matched with at least one viewpoint index number is determined, and the viewpoint image matched with the viewpoint index number is used as a viewpoint image matched with the sub-pixel 211.

In step S252, the sub-pixel 211 is driven to display according to the determined viewpoint image, so as to form a target display picture.

In some embodiments, the display method further includes establishing an image source library, and the establishing the image source library includes step S210 and step S220.

Figure 9A:
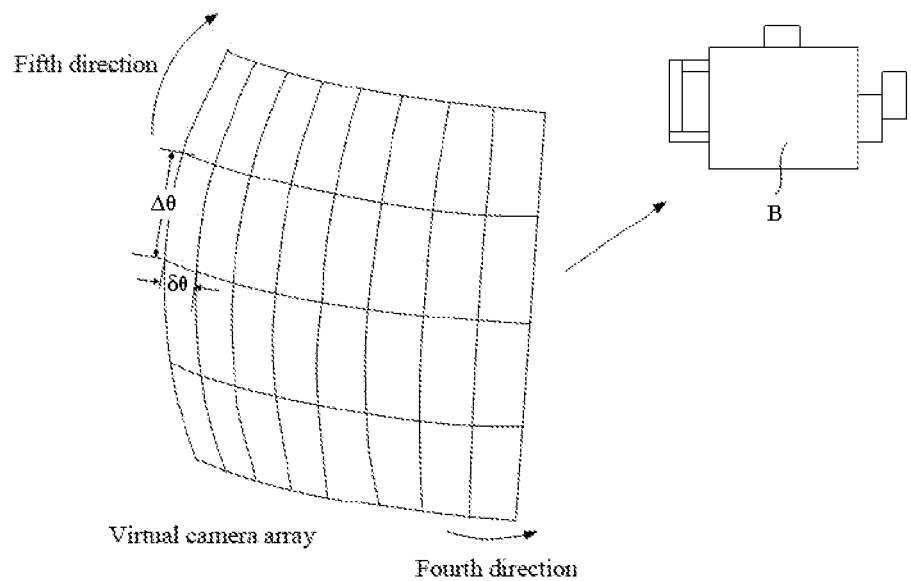
FIG. 9a schematically shows a schematic diagram of a virtual camera array in the embodiments of the present disclosure.

In S210, a virtual camera array is established. FIG. 9a schematically shows a schematic diagram of a virtual camera array in the embodiments of the present disclosure. As shown in FIG. 9a, the virtual camera array takes δθ as a first acquisition step size, and Δθ as a second acquisition step size, wherein the δθ a projected angle of each sub-pixel 211, the Δθ is a preset angle positioning accuracy.

In S220, an image of a target object is collected by using the virtual camera array to construct the image source library.

In the embodiments of the present disclosure, a three-dimensional scene model, that is, the image B of the target object, is first established. Then, according to the parameters of the sub-pixel 211 and the lenticular lens, the projected angle size δθ of each sub-pixel 211 is determined. A virtual camera array is established in two dimensions, e.g., a fourth direction and a fifth direction in FIG. 9a. An angular step size of the virtual camera array in the fourth direction is the first acquisition step size δθ, and an angular step size of the virtual camera array in the fifth direction is the second acquisition step size Δθ. Each grid in the virtual camera array may correspond to one visual area in the visual area distribution map, and a picture is taken in each grid position, thereby obtaining a multi-view source library.

In some embodiments, the display method further includes establishing an angle spectrum library, and the establishing an angle spectrum library includes step S410 to step S430.

In step S410, angular spectra of a plurality of sub-pixels 211 in one pixel island 21 are acquired to obtain a plurality of initial angular spectra.

In step S420, each initial angle spectrum is processed according to boundaries of the plurality of initial angle spectra to obtain a plurality of target angular spectra. Optionally, angular ranges of the plurality of target angular spectra do not overlap.

In step S430, an angular spectrum library is constructed based on the plurality of target angular spectra.

Figure 9B:
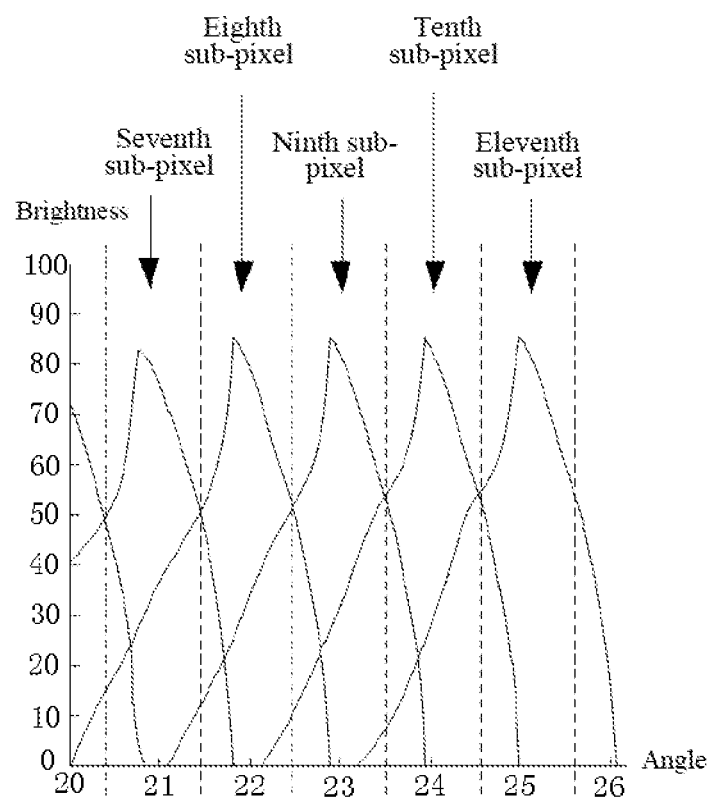
FIG. 9b schematically shows a schematic diagram of initial angular spectra of some sub-pixels in the pixel island in the embodiments of the present disclosure.

In the embodiments of the present disclosure, FIG. 9b schematically shows a schematic diagram of initial angular spectra of some sub-pixels in the pixel island in the embodiments of the present disclosure. In FIG. 9b, the abscissa represents the angle, and the ordinate represents the brightness. As shown in FIG. 9b, the initial angular spectrum ranges of two adjacent sub-pixels overlap each other, and a junction (that is, as shown by a dotted line in FIG. 9b) of the two is the boundary of the initial angular spectrum. For the initial angular spectrum of each sub-pixel, extracting the part within the boundary may obtain the target angular spectrum of each sub-pixel.

In some embodiments, when the pitch between the lenticular lenses is equal to or an integer multiple of the pitch between the pixel islands 21, the angular spectra of the sub-pixels 211 of different pixel islands 21 are the same.

In some embodiments, when the pitches between the lenticular lenses and the pitches between the pixel islands 21 are not equal and are not in an integer multiple relationship, it is necessary to test the angular spectrum of the sub-pixels 211 of the pixel islands 21 at a plurality of positions, and obtain light-emitting angle spectrum of the sub-pixels 211 of each pixel island 21 by an interpolation method.

Figure 10:
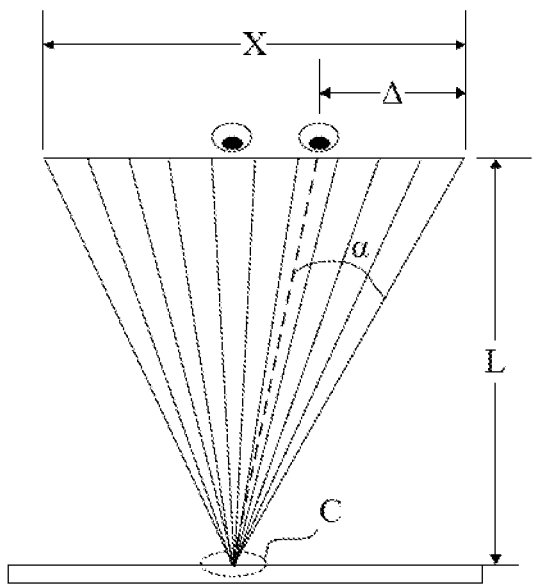
FIG. 10 schematically shows another schematic diagram of a light path of the display device in the embodiments of the present disclosure.
Figure 11:
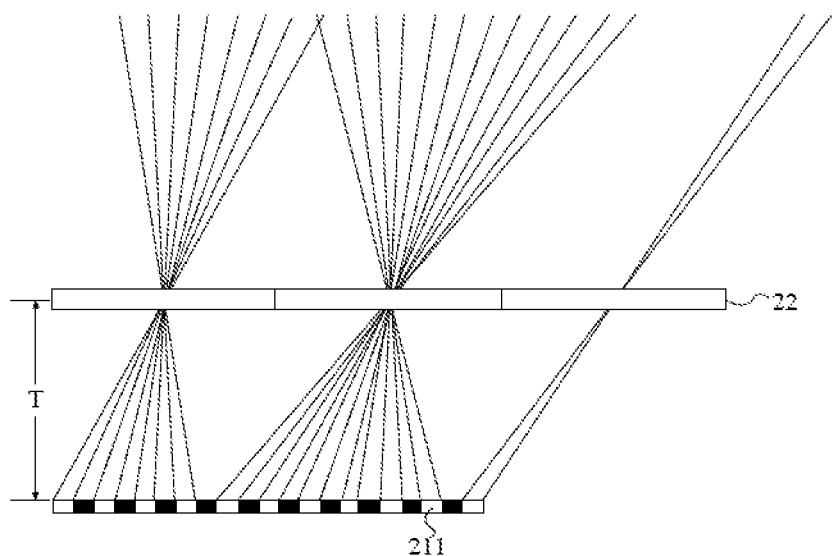
FIG. 11 schematically shows an enlarged view at position C in FIG. 10.
Figure 12:
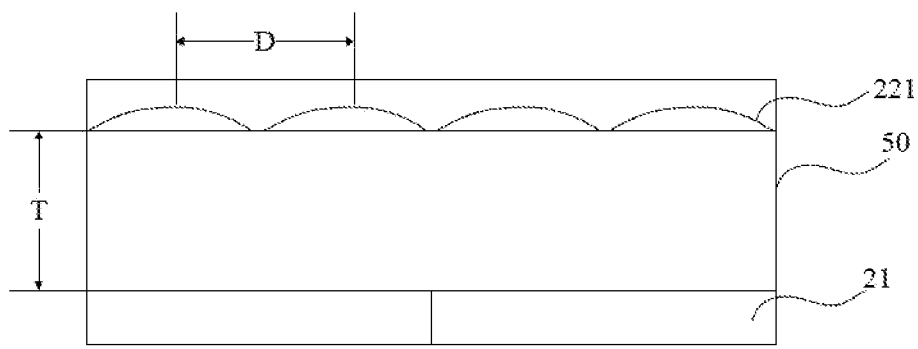
FIG. 12 schematically shows a cross-sectional view of an optical path adjustment structure in the embodiments of the present disclosure.

FIG. 10 schematically shows a second schematic diagram of the light path of the display device in the embodiments of the present disclosure. FIG. 11 schematically shows an enlarged view at position C in FIG. 10. FIG. 12 schematically shows a cross-sectional view of an optical path adjustment structure in the embodiments of the present disclosure. As shown in FIG. 10 to FIG. 12, in the embodiments of the present disclosure, a maximum value of the reporting point error of eye tracking is Δ, a corresponding angle is α, and corresponding relational expressions are as follows:

$$\frac{X}{D} = \frac{L}{T/n} \quad (1)$$

$$\Delta = \frac{X - P}{2} \quad (2)$$

$$\alpha = \frac{\Delta}{L} * \frac{180}{\pi} \quad (3)$$

X is a projection width of 11 viewpoint images, L is a viewing distance, D is a pitch of the lenticular lens, T is a placement height of the lenticular lens, n is a refractive index of a spacer glass medium layer 50, and P is an interpupillary distance of the human eye, sorting out formulas (1), (2) and (3) to obtain:

$$\alpha = \frac{90(nDL - TP)}{TL\pi} \quad (4)$$

Let L=500 mm, D=77.055 μm, T=565 μm, n=1.5, P=65 mm be substituted into formula (4), resulting in α=2.1°. Therefore, in the embodiments of the present disclosure, in order to ensure that the human eye may always see a correct view of the location, it is required that the reporting point error be less than or equal to 2.1°.

Based on the above-mentioned display method, the embodiments of the present disclosure further provide a display device. In the embodiments of the present disclosure, the display device includes a tablet personal computer (PC), a smart phone, a personal digital assistant (PDA), a portable multimedia player, a game console or a wristwatch electronic device, and the like. However, the embodiments of the present disclosure are not intended to limit the types of display devices. In some embodiments, the display device may be used not only in large electronic devices such as a television (TV) or an external billboard, but also in medium or small electronic devices such as a PC, a notebook computer, a car navigation device or a camera. As shown in FIG. 2a to FIG. 12, the display device includes a plurality of pixel islands 21, at least one pixel island 21 includes a plurality of sub-pixels 211, and the display device further includes a processing module configured to:

acquire a viewing position of a user;

determine a viewpoint image matched with the viewing position from an image source library to obtain a first viewpoint image;

determine a plurality of viewpoint images having parallax with the first viewpoint image from the image source library to obtain a parallax image set;

determine a center sub-pixel 211 from the plurality of sub-pixels 211 in the pixel island 21 for the at least one pixel island 21 according to a positional relationship between the viewing position and at least one sub-pixel 211 in the pixel island 21; and drive the center sub-pixel 211 in the at least one pixel island 21 to display according to the first viewpoint image, and drive other sub-pixels 211 in the at least one pixel island 21 to display according to the parallax image set, so as to form a target display picture, wherein the target display picture is configured to enable the user to see a three-dimensional image corresponding to the first viewpoint image when viewing the display device at the viewing position.

With the display device of the embodiments of the present disclosure, since the first viewpoint image is matched with the user's viewing position, when the user moves, the first viewpoint image changes accordingly, that is, the angle of view of the target display picture also changes accordingly, so as to achieve a stereoscopic vision. For example, taking a kettle as an example, when the user views the display device from the front, he may see the front of the kettle; and when the user moves to the left or right, he may see the sides of the kettle, so as to achieve continuous motion parallax. At the same time, the display method of the embodiments of the present disclosure performs the display through the first viewpoint image in conjunction with the parallax image set. Even if a reporting error occurs during eye tracking, by displaying the viewpoint images in the parallax image set, the parallax jitter of the images viewed by the user may be avoided, and the erroneous visual experience caused by the jitter may be improved. Furthermore, with the display method of the embodiments of the present disclosure, the center sub-pixel 211 in each pixel island 21 may be determined in real time according to a change of an viewing position, and then a corresponding layout may be performed to realize a dynamic layout, so as to replace the fixed layout method adopted in FIG. 1*a* and FIG. 1*b*. Hence, a precision requirement on the optical structure may also be reduced.

In some embodiments, the display device further includes an optical path adjustment structure 22, such as a lenticular lens. The light path adjustment structure is configured such that light emitted from the at least one pixel island 21 forms a plurality of consecutive visual areas on a preset projection surface after passing through the light path adjustment structure 22. At least one sub-pixel 211 in at least one pixel island 21 is matched with at least one visual area.

In some embodiments, a plurality of sub-pixels 211 of at least one pixel island 21 are arranged in a first direction, the optical path adjustment structure 22 includes a plurality of lenticular units, and each lenticular unit includes a plurality of lenticular lenses arranged in the first direction, one pixel island 21 is covered by a plurality of lenticular lenses. For example, each lenticular unit includes two lenticular lenses, and one pixel island 21 is covered by the two lenticular lenses.

In some embodiments, the sub-pixels 211 in a same pixel island 21 have a same color.

According to the embodiments of the present disclosure, the processing modules may be combined into one module for implementation, or split into a plurality of modules. Alternatively, at least part of the functionality of one or more of these modules may be combined with at least part of the functionality of other modules and implemented in one module. According to the embodiments of the present disclosure, a processing module may be implemented at least in part as a hardware circuit, such as a field programmable gate array (FPGA), a programmable logic array (PLA), a system on a chip, a system on a substrate, a system on a package, an application specific integrated circuit (ASIC), or may be implemented by hardware or firmware such as any other reasonable way of integrating or encapsulating circuits, or may be implemented in any one of three implementation modes of software, hardware and firmware or any appropriate combination thereof. Alternatively, a processing module may be implemented, at least in part, as a computer program module that, when executed, may perform matching functions.

The flowcharts and block diagrams in the drawings illustrate the architecture, functionality, and operation of possible implementations of systems, methods and computer program products according to various embodiments of the present disclosure. In this regard, each block in the flowcharts or block diagrams may represent a module, program segment, or portion of code, which contains one or more executable instructions for implementing the specified logical function. It should also be noted that, in some alternative implementations, the functions noted in the blocks may occur out of the order noted in the drawings. For example, two blocks shown in succession may, in fact, be executed substantially concurrently, or the two blocks may sometimes be executed in a reverse order, depending upon the functionality involved. It should also be noted that each block of the block diagrams or flowcharts, and combinations of the blocks in the block diagrams or flowcharts, may be implemented by using a special purpose hardware-based system that performs the specified functions or operations, or may be implemented using a combination of a special purpose hardware and computer instructions.

Those skilled in the art will appreciate that features recited in the various embodiments of the present disclosure and/or the claims may be combined or/or incorporated in a variety of ways, even if such combinations or incorporations are not clearly recited in the present disclosure. In particular, the features recited in the various embodiments of the present disclosure and/or the claims may be combined and/or incorporated without departing from the spirit and teachings of the present disclosure, and all such combinations and/or incorporations fall within the scope of the present disclosure.

The embodiments of the present disclosure have been described above. However, these embodiments are for illustrative purposes only, and are not intended to limit the scope of the present disclosure. Although the various embodiments are described above separately, this does not mean that the measures in the various embodiments may not be advantageously used in combination. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:

1. A display method, applied in a display device, the display device comprising a plurality of pixel islands, at least one of the pixel islands comprising a plurality of sub-pixels, and the display method comprising:
acquiring a viewing position of a user;
determining a viewpoint image matched with the viewing position from an image source library to obtain a first viewpoint image;
determining a plurality of viewpoint images having parallax with the first viewpoint image from the image source library to obtain a parallax image set;
determining, for at least one of the pixel islands, a center sub-pixel from a plurality of sub-pixels in the pixel island according to a positional relationship between the viewing position and at least one sub-pixel in the pixel island; and
driving the center sub-pixel in at least one of the pixel islands to display according to the first viewpoint image, and driving other sub-pixels in at least one of the pixel islands to display according to the parallax image set, so as to form a target display picture, wherein the target display picture is configured to enable the user to see a three-dimensional image corresponding to the first viewpoint image when viewing the display device at the viewing position.

2. The display method according to claim 1, wherein a reference point is configured in a display area of the display device, and the determining a viewpoint image matched with the viewing position from an image source library to obtain a first viewpoint image comprises:
   determining a visual area matched with the viewing position from a preset visual area distribution map according to a position difference between the viewing position and the reference point to obtain a first visual area; and
   extracting a viewpoint image matched with the first visual area from the image source library to obtain the first viewpoint image.

3. The display method according to claim 2, wherein the determining a visual area matched with the viewing position from a preset visual area distribution map according to a position difference between the viewing position and the reference point to obtain a first visual area comprises:
   determining an angle coordinate of the viewing position relative to the reference point according to a preset angle coordinate system, wherein the preset angle coordinate system is an angle coordinate system established according to the reference point and a plane where the display area is located; and
   determining a visual area matched with the angle coordinate from the preset visual area distribution map to obtain the first visual area.

4. The display method according to claim 3, wherein the reference point is located at a center of the display area.

5. The display method according to claim 2, wherein the determining a plurality of viewpoint images having parallax with the first viewpoint image from the image source library to obtain a parallax image set comprises:
   determining a viewpoint image having a first preset parallax relationship with the first viewpoint image from the image source library to obtain at least one second viewpoint image;
   determining a viewpoint image having a second preset parallax relationship with the first viewpoint image from the image source library to obtain at least one third viewpoint image; and
   constructing a parallax image set by the at least one second viewpoint image and the at least one third viewpoint image, wherein a parallax of the at least one second viewpoint image and the first viewpoint image is opposite to a parallax of the at least one third viewpoint image and the first viewpoint image.

6. The display method according to claim 5, wherein the number of the second viewpoint images is the same as the number of the third viewpoint images.

7. The display method according to claim 5, wherein the number of the second viewpoint images and the number of the third viewpoint images are both multiple, parallaxes between different second viewpoint images and the first viewpoint image are different, and parallaxes between different third viewpoint images and the first viewpoint image are different.

8. The display method according to claim 1, wherein the determining, for at least one of the pixel islands, a center sub-pixel from a plurality of sub-pixels in the pixel island according to a positional relationship between the viewing position and at least one sub-pixel in the pixel island comprises:
   determining an angular relationship between the viewing position and the pixel island according to a positional relationship between the viewing position and the pixel island; acquiring an angular spectrum of at least one sub-pixel in the pixel island from an angular spectrum library;
   determining a sub-pixel matched with the viewing position from a plurality of sub-pixels of the pixel island according to the angular spectrum of at least one sub-pixel and the angular relationship; and
   using the determined sub-pixel as the center sub-pixel.

9. The display method according to claim 1, wherein the driving other sub-pixels in at least one of the pixel islands to display according to the parallax image set, so as to form a target display picture, comprises:
   determining, for at least one sub-pixel among other sub-pixels in the at least one pixel island, a viewpoint image matched with the sub-pixel from the parallax image set according to a preset layout rule; and
   driving the sub-pixel to display according to the determined viewpoint image.

10. The display method according to claim 9, wherein among other sub-pixels of the at least one pixel island, at least one sub-pixel is matched with at least one viewpoint image, and different sub-pixels are matched with different viewpoint images.

11. The display method according to claim 9, wherein the display method further comprises:
   acquiring viewpoint index numbers of a plurality of sub-pixels in at least one of the pixel islands;
   sorting the acquired viewpoint index numbers to form a viewpoint index number sequence;
   wherein the determining, for at least one sub-pixel among other sub-pixels in the at least one pixel island, a viewpoint image matched with the sub-pixel from the parallax image set according to a preset layout rule comprises:
   determining a viewpoint image matched with a viewpoint index number from the parallax image set according to a positional relationship between viewpoint index numbers of other sub-pixels and a viewpoint index number of the center sub-pixel in the index number sequence; and
   determining a sub-pixel matched with at least one viewpoint index number according to a preset mapping rule, and using the viewpoint image matched with the viewpoint index number as a viewpoint image matched with the sub-pixel.

12. The display method according to claim 11, wherein the user comprises a first observation eye and a second observation eye, and the viewing position is located the between the first observation eye and the second observation eye;
   wherein the determining a viewpoint image matched with a viewpoint index number from the parallax image set according to a positional relationship between viewpoint index numbers of other sub-pixels and a viewpoint index number of the center sub-pixel in the index number sequence comprises:
   dividing remaining viewpoint index numbers into a first viewpoint index number group corresponding to the first observation eye and a second viewpoint index number group corresponding to the second observation eye according to a position of the viewpoint index number of the center sub-pixel in the index number sequence; and determining a viewpoint image matched with the viewpoint index number in the first viewpoint index number group from a plurality of second viewpoint images; and determining a viewpoint image matched with the viewpoint index number in the second viewpoint index number group from a plurality of third viewpoint images.

13. The display method according to claim 12, wherein, for the first viewpoint index number group, when the viewpoint index numbers of the first viewpoint index number group comprise first n viewpoint index numbers and last m viewpoint index numbers in the viewpoint index number sequence, determining a viewpoint image matched with the viewpoint index number in the first viewpoint index number group from the plurality of second viewpoint images according to a preset first shift and extension rule; and for the second viewpoint index number group, when the viewpoint index numbers of the second viewpoint index number group comprise first n viewpoint index numbers and last m viewpoint index numbers in the view index number sequence, determining a viewpoint image matched with the viewpoint index number in the second viewpoint index number group from the plurality of third viewpoint images according to a preset second shift and extension rule, wherein the shift and extension directions of the first shift and extension rule and the second and shift extension rule are opposite.

14. The display method according to claim 1, wherein the display method further comprises establishing an image source library, and the establishing an image source library comprises:

establishing a virtual camera array, wherein the virtual camera array takes δθ as a first acquisition step size and Δθ as a second acquisition step size; wherein the δθ is a projected angle of each sub-pixel, and the Δθ is a preset angle positioning accuracy; and collecting an image of a target object by using the virtual camera array to construct the image source library.

15. The display method according to claim 8, wherein the display method further comprises establishing an angle spectrum library, and the establishing an angle spectrum library comprises:

acquiring, for at least one of the pixel islands, angular spectra of a plurality of sub-pixels in the pixel island to obtain a plurality of initial angular spectra;

processing each initial angular spectrum according to boundaries of the plurality of initial angular spectra to obtain a plurality of target angular spectra; and constructing the angular spectrum library based on the plurality of target angular spectra.

16. A display device, the display device comprising a plurality of pixel islands, at least one of the pixel islands comprising a plurality of sub-pixels, the display device further comprising a processing module configured to:

acquire a viewing position of a user;

determine a viewpoint image matched with the viewing position from an image source library to obtain a first viewpoint image;

determine a plurality of viewpoint images having parallax with the first viewpoint image from the image source library to obtain a parallax image set;

determine, for at least one of the pixel islands, a center sub-pixel from a plurality of sub-pixels in the pixel island according to a positional relationship between the viewing position and at least one sub-pixel in the pixel island; and drive the center sub-pixel in at least one of the pixel islands to display according to the first viewpoint image, and drive other sub-pixels in at least one of the pixel islands to display according to the parallax image set, so as to form a target display picture, wherein the target display picture is configured to enable the user to see a three-dimensional image corresponding to the first viewpoint image when viewing the display device at the viewing position.

17. The display device according to claim 16, wherein the display device further comprises an optical path adjustment structure; the optical path adjustment structure is configured such that light emitted from at least one of the pixel islands forms a plurality of consecutive views on a preset projection plane after passing through the light path adjustment structure.

18. The display device according to claim 16, wherein a plurality of sub-pixels of at least one of the pixel islands are arranged in a first direction, an optical path adjustment structure comprises a plurality of lenticular units, each lenticular unit comprises a plurality of lenses arranged in the first direction, and each pixel island is covered by a lenticular unit.

19. The display device according to claim 16, wherein sub-pixels in a same pixel island have a same color.

* * * * *